S. E. STOKES, Jr.
SAFETY HOISTING APPARATUS.
No. 174,318. Patented Feb. 29, 1876.
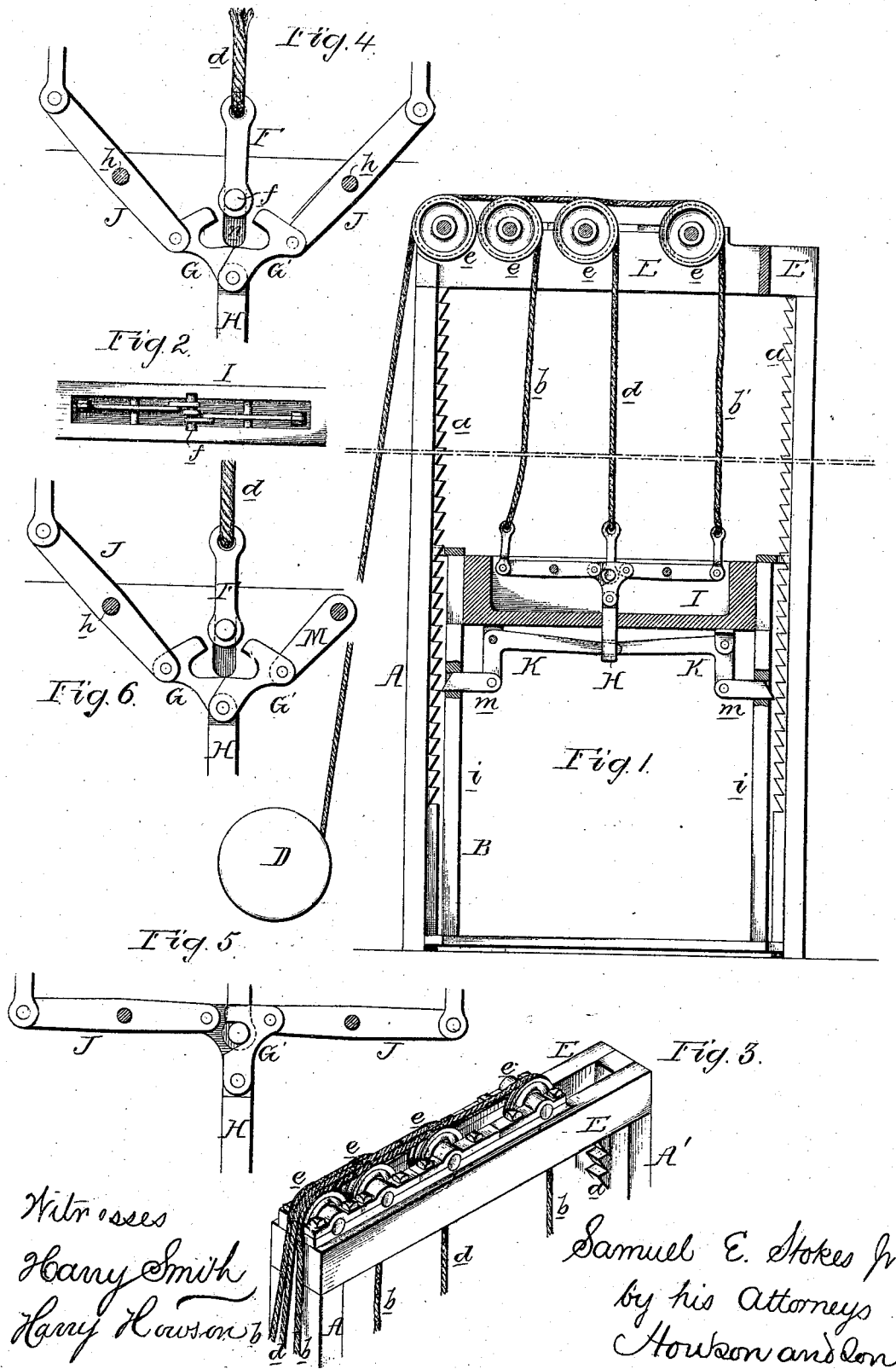

UNITED STATES PATENT OFFICE.

SAMUEL E. STOKES, JR., OF PHILADELPHIA, PENNSYLVANIA.

IMPROVEMENT IN SAFETY HOISTING APPARATUS.

Specification forming part of Letters Patent No. 174,318, dated February 29, 1876; application filed January 7, 1876.

*To all whom it may concern:*

Be it known that I, SAMUEL E. STOKES, Jr., of Philadelphia, Pennsylvania, have invented certain Improvements in Safety Hoisting Apparatus, of which the following is a specification:

The object of my invention is to combine with the cage of hoisting apparatus safety-ropes and other appliances by which the certain arresting of the cage is insured when the main hoisting-rope breaks.

In the accompanying drawing, Figure 1 is a front view, partly in section, of my improved hoisting mechanism; Fig. 2, a top view of the cross-bar of the cage; Fig. 3, a perspective view of the upper portion of the frame; Figs. 4 and 5, views drawn to an enlarged scale of the retaining device.

A A' are the vertical side frames between which the cage B is guided and raised and lowered, each frame having on its inner side the usual rack $a$ for receiving a catch, referred to hereafter. D is the hoisting-drum, arranged for simultaneously winding and simultaneously unwinding the three ropes $b$ $b'$ and $d$, which pass upward and over grooved pulleys $e$, the spindles of which are adapted to suitable bearings on the cross-bars E E secured to the frames A A', as shown in Fig. 3. The central rope $d$ is secured to the upper end of a link, F, from each side of the lower end of which projects a pin, $f$, adapted to and guided by recesses or slots in the cross-piece I of the cage, and to the hooked portions of the arms G and G', the lower ends of which are connected to a link, H, the latter passing through and being guided by the said cross-piece I. Each of the arms G G' is connected to one arm of a lever, J, which has its fulcrum on a pin, $h$, in the cross-bar I, the other arms of the two levers being connected, one to one rope, $b$, and the other to the other rope, $b'$. The ends of the long arms of bell-crank levers K, which are hung to pins on the under side of the cross-bar I, fit snugly, but so as to slide freely in an eye or slot at the lower end of the link H, and the short arms of the bell-crank levers are connected to catches $m$, which are arranged to slide in the sides $i$ $i$ of the cage B, and are adapted to the teeth of the racks $a$ $a$.

It should be here understood that the central rope $d$ is the main hoisting-rope, and that, although all the ropes are simultaneously wound on and simultaneously unwound from the drum D at the same speed as the cage is raised or lowered, the ropes $b$ and $b'$ are slack and perform no duty as long as the central main rope remains entire.

As shown in Fig. 1, the cage is supported entirely by the central rope $d$ and link H, a collar on which bears against the under side of the cross-bar I of the cage, the arms G G' being hooked onto the pin $f$ and the catches $m$ $m$ clear of the racks $a$ $a$. The moment the main rope $d$ breaks, however, the first downward movement of the cage will tighten the ropes $b$ $b'$, and this will cause the arms J J to move the arms G G' outward clear of the pin $f$, will depress the link H, and, through the medium of the bell-crank levers K, will move the catches $m$ $m$ into gear with the rack, thereby arresting the cage after it has moved the short distance necessary to insure this result.

When the rope breaks near the drum in ordinary hoisting apparatus, the weight of or drag on the rope is frequently sufficient to prevent the proper action of the springs connected with the usual arresting mechanism; but should the main hoisting-rope break near the drum in my improved hoisting apparatus, the link F will be entirely released from the cage, and, consequently, all influence of the hoisting-rope on the arresting mechanism will cease.

It should be understood that, although I have shown two safety-ropes, one only may be used in light hoisting apparatus, in which case a short arm, M, Fig. 6, will be substituted for one of the levers J. In heavy hoisting apparatus more than one safety-rope may be connected to each lever J.

I claim as my invention—

1. The combination, in hoisting apparatus, of the main rope $d$, a loose safety rope or ropes, $b$ $b'$, on which there is no hoisting-strain, and a drum, D, for winding and unwinding all the ropes at the same speed, with the safety-catches $m$ and mechanism, substantially as described, through the medium of which the safety-ropes are caused to operate the catches when the main rope breaks, all substantially as specified.

2. The hooked arms G G', for retaining and releasing the main hoisting-rope, the said arms being connected to the cage-arresting mechanism, in combination with devices, substantially as described, whereby the safety rope or ropes are caused to release the said hooks from the main hoisting-rope.

In testimony whereof I have signed my name to this specification in the presence of two subscribing witnesses.

SAMUEL E. STOKES, Jr.

Witnesses:
HARRY HOWSON, Jr.,
HARRY SMITH.